United States Patent
Vaudano et al.

(10) Patent No.: US 8,716,158 B2
(45) Date of Patent: May 6, 2014

(54) METHOD FOR REGENERATING A SOLID IODINE FILTER

(75) Inventors: Aimé Vaudano, Bagnols sur Ceze (FR); Frédéric Payot, Aix en Provence (FR); Jean-Pierre Donnarel, Saint Alexandre (FR); Frédéric Devisme, Roquemaure (FR); Josiane Madeleine Courbis, legal representative, Roquemaure (FR); Marie Pauline Madeleine Devisme, legal representative, Roquemaure (FR)

(73) Assignees: Areva NC, Paris (FR); Commissariat a l'Energie Atomique et aux Energies Alternatives, Paris (FR)

( * ) Notice: Subject to any disclaimer, the term of this patent is extended or adjusted under 35 U.S.C. 154(b) by 207 days.

(21) Appl. No.: 13/384,751

(22) PCT Filed: Jul. 16, 2010

(86) PCT No.: PCT/EP2010/060301
§ 371 (c)(1),
(2), (4) Date: Mar. 30, 2012

(87) PCT Pub. No.: WO2011/009816
PCT Pub. Date: Jan. 27, 2011

(65) Prior Publication Data
US 2012/0220448 A1   Aug. 30, 2012

(30) Foreign Application Priority Data

Jul. 20, 2009   (FR) ...................... 09 55029

(51) Int. Cl.
*B01J 38/62* (2006.01)
(52) U.S. Cl.
USPC ............................. 502/28; 502/25

(58) Field of Classification Search
USPC ......................... 502/25, 27, 28, 29
See application file for complete search history.

(56) References Cited

U.S. PATENT DOCUMENTS

| | | |
|---|---|---|
| 3,658,467 A | 4/1972 | Maeck |
| 4,088,737 A | 5/1978 | Thomas et al. |
| 4,382,879 A | 5/1983 | Funabashi et al. |
| 7,101,822 B2 | 9/2006 | Devisme et al. |

FOREIGN PATENT DOCUMENTS

WO   02/073629   9/2002

OTHER PUBLICATIONS

French Patent Office Search Report for Application No. 0955029, dated Feb. 9, 2010, in 2 pages.
International Search Report and Written Opinion dated Sep. 24, 2010 for PCT Application No. PCT/EP2010/060301 filed Jul. 16, 2010.

*Primary Examiner* — Edward Johnson
(74) *Attorney, Agent, or Firm* — Knobbe Martens Olson and Bear, LLP

(57) ABSTRACT

A method for regenerating a solid filter containing iodine in the form of silver iodide and/or iodate and possibly molecular iodine physisorbed, in a solid filter containing silver in the form of nitrate. The iodine is extracted from the filter by putting the filter into contact with a basic aqueous solution containing a reducing agent. The extraction is achieved at room temperature, and then the filter is separated from this basic aqueous solution. Next, silver is extracted from the filter by putting the filter into contact with an acid aqueous solution. The filter is then separated from the acid aqueous solution. Finally, the filter is impregnated with silver by putting the filter into contact with a silver nitrate solution and then drying the filter. This method can be used in nuclear installations, notably factories for reprocessing used nuclear fuels.

10 Claims, No Drawings

METHOD FOR REGENERATING A SOLID IODINE FILTER

RELATED APPLICATIONS

This application is a U.S. National Phase of International Application No. PCT/EP2010/060301, filed Jul. 16, 2010, designating the U.S., and published in French as WO 2011/009816 on Jan. 6, 2011 which claims the benefit of French Patent Application No. 0955029 filed Jul. 20, 2009

BACKGROUND OF THE INVENTION

1. Field of the Invention

The present invention relates to a method for regenerating a solid iodine filter of the type of those used in factories for reprocessing irradiated nuclear fuels in order to trap the residual iodine present in the gas effluents produced during this reprocessing.

2. Description of the Related Art

In factories for reprocessing irradiated nuclear fuels, the recovery of residual iodine contained in the gas effluents in the form of molecular iodine $I_2$ and/or of organic compounds of iodine such as iodo-alkanes or alkyl iodides, is ensured, before discharging these gas effluents into the environment, by mineral solid traps commonly designated as <<iodine filters>>.

These are cartridges filled with porous silica or alumina beads which are impregnated with silver in nitrate form. In these iodine filters, the iodine reacts with the silver nitrate in order to form iodine compounds such as silver iodide and iodate with possibly a low presence of physisorbed molecular iodine $I_2$.

These iodine filters form a solid waste contaminated with $^{129}I$ (which is a long lifetime radioelement) which cannot be directly stored at the surface and for which no matrix for storage in depth is available today.

Consequently, in the international PCT application published under number 02/073629, a method was proposed which allows decontamination of a used iodine filter, either from iodine, or from iodine and silver, and its declassification may thereby be obtained for admission, after packaging in a cement matrix, into a surface storage center.

According to this method, the filter is decontaminated from iodine by immersion in an aqueous basic solution, which is heated to 60° C. and which contains a reducing agent such as for example ascorbic acid, able to transform the iodine compounds into soluble iodide anions ($I^-$). It may further be decontaminated from silver, either simultaneously by adding cyanide to the aqueous basic solution used for the decontamination from iodine, or successively by washing the filter in an acid solution, typically a solution of nitric acid, capable of dissolving the silver which it contains.

If this method unquestionably represents a technical progress, it however has the drawback:
- in the case when the silver is removed from the filter, of adding to the reprocessing of irradiated nuclear fuels, already generating significant volumes of non-recoverable liquid effluents, additional liquid effluents loaded with silver which will have to be treated, and
- in the case when the silver is not removed from the filter, of losing the silver which remains in this filter.

Now, it turns out that within the scope of their work on iodine filters, the Inventors noticed:
- on the one hand, that against all expectations, the structure and the physical characteristics (porosity, specific surface area, . . . ) of these filters are only altered very little by use for several years in the factory, notably when they comprise an alumina support;
- on the other hand, that the reducing treatment recommended in WO-A-02/073629 when it is carried out at room temperature allows very efficient decontamination of these filters from iodine without however extracting the silver present in the filters nor extensively altering the structure and the physico-chemical properties of these filters; and
- finally, that it is possible after having extracted from used iodine filters both the iodine and the silver which they contain, to re-impregnate them very efficiently with silver and this by notably using as an impregnation solution, the acid aqueous solution having been used for decontaminating them from silver or a solution prepared from the latter.

And it is on the basis of these observations that the inventors have achieved the present invention.

DETAILED DESCRIPTION OF THE PREFERRED EMBODIMENT

The object of the present invention is therefore a method for regenerating a solid filter containing iodine in the form of silver iodide and/or iodate and possibly molecular iodine physisorbed, in a solid filter containing silver in the form of nitrate, which comprises the following steps:

a) extracting from the filter the iodine which it contains by putting this filter in contact with a basic aqueous solution containing a reducing agent, this extraction being carried out at room temperature, and then by separating this basic aqueous solution from the filter;

b) extracting from the filter obtained in step a) the silver which it contains by putting this filter into contact with an acid aqueous solution, and then separating this acid aqueous solution from the filter; and c) impregnating with silver the filter obtained in step b) by putting this filter into contact with a silver nitrate solution, and then drying the filter.

According to the invention, the reducing agent present in the basic aqueous solution used in step a) may be any of the reducing agents, the use of which is recommended in WO-A-02/073629, i.e. hydroxylamine, hydroxylamine salt, ascorbic acid, ascorbic acid salt, ascorbyl ester, sodium borohydride, sodium hypophosphite, formaldehyde, urea, formic acid, or further a mixture of the latter.

However, for reasons of both simplicity of application and of compatibility with existing reprocessing installations, it is preferred that the reducing agent be ascorbic acid or one of its salts, notably sodium ascorbate, in which case it is preferably present in the basic aqueous solution at a concentration from 0.5 to 2 mol/L and even better of the order of 1 mol/L.

This basic aqueous solution preferably has a pH from 10 to 14, this pH may equally be obtained by means of a mineral base such as soda, or of a water-soluble organic base such as tetramethylammonium hydroxide, ammonia or the like.

Extraction of the iodine from the filter by means of the basic aqueous solution is advantageously achieved by washing the filter with this solution, for example by having the latter circulate slowly through the filter, in a closed or open circuit.

However, it may also be achieved by simply soaking the filter in said solution.

In every case, from 4 to 10 mL of basic aqueous solution per g of filter are preferably used and the processing time (washing or soaking) is advantageously comprised between 2 and 10 hours and even better from 2 to 4 hours.

After this, the filter is separated from the basic aqueous solution and this filter is subjected preferably to one and even better several rinses with water, advantageously demineralized water, in order to remove from the filter any trace of reducing agent.

Under these conditions, at the end of step a) a filter is obtained for which the residual iodine content is at most equal to 3 mg per g of filter, which corresponds to a decontamination factor equal to or greater than 30 for an initial content of about 100 mg of iodine per g of filter, and for which the silver content is substantially equal to the initial silver content of the filter.

In step b), a solution of nitric acid is preferably used as an acid aqueous solution, which by dissolving the silver present in the filter, will gradually become a solution of silver nitrate, the use of which in step c) will then be possible, either as such, or after adjusting its silver content and/or its acidity, in order to impregnate the filter with silver. This nitric acid solution preferably has a nitric acid concentration from 0.2 to 6 mol/L and even better of the order of 1 mol/L.

The extraction of the silver from the filter by means of the acid aqueous solution is advantageously achieved by washing the filter with this solution, for example by having the latter circulate slowly through the filter, in a closed or open circuit.

However, there also, it is possible to achieve this extraction by simply soaking the filter in said solution.

In every case, this extraction is preferably achieved at a temperature from 20 to 60° C. by using 1 to 30 mL of an acid aqueous solution per g of filter, and the processing time (washing or soaking) is advantageously comprised between 15 minutes and 24 hours.

After separating the filter from this solution, the filter is preferably subjected to drying for 5 to 24 hours, which is advantageously achieved in air in an oven or in a partial vacuum (for example, of the order of 100 Pa), at a temperature below 120° C. This drying may be completed by drying under an inert atmosphere, for example in an argon flow, at temperatures from 120 to 500° C., the latter drying type actually allowing improvement in the performances of the impregnation of the filter with silver.

According to the invention, the silver nitrate solution which is used for carrying out this impregnation (step c) of the method) may be a solution which is specifically prepared for this purpose, in which case this may be both an aqueous solution either acid or not, and an organic solution having acetonitrile for a solvent for example.

However, the acid aqueous solution, which was used for extracting the silver from the filter in step b), is preferably used as an impregnation solution, after adjusting if necessary its silver concentration and/or its acidity, insofar that this allows both reduction in the amounts of reagents and of solvents used during the process as well as the produced volumes of effluents, and recovery of the silver extracted from the filter.

In every case, it is desirable that this impregnation solution have a silver concentration from 20 to 200 g/L and, even better of the order of 100 g/L.

Its putting into contact with the filter is advantageously achieved by soaking but impregnation of the filter by circulating the impregnation solution through this filter, in a closed or open circuit, may also be contemplated.

As for the drying of the filter provided in step c), it is preferably achieved at a temperature below 120° C., at atmospheric pressure or under a partial vacuum.

Under these conditions, at the end of step c), are obtained on the one hand a filter which contains about 12% by mass of elementary silver in the form of nitrate, i.e. an elementary silver content equivalent to the one which iodine filters conventionally have before use, and on the other hand a solution depleted in silver nitrate which may either be sent to be discarded or reused for extracting from another filter the silver which it contains if this an acid aqueous solution.

The solid filters which may be regenerated by the method according to the invention may be of various types from the moment that they comprise a mineral or organic inner porous support, capable of being impregnated with silver in the form of nitrate.

These may notably be filters with porous beads of silica or alumina of the type of those used in factories for reprocessing used fuels.

The method according to the invention has many advantages.

Indeed, not only it allows the re-use of used iodine filters and/or the silver extracted from these filters and thus produce savings in the purchase of new filters and/or of silver nitrate, but it also allows substantial reduction in the volumes of final wastes and the volumes of liquid effluents generated by the reprocessing of used nuclear fuels.

In this respect, it should be noted that the silver extracted from used iodine filters, according to the invention, may also be used for impregnating new supports of filters.

Further, the method according to the invention has the advantage of being simple to apply and only resorting to reagents and solvents of current use in the chemical industry, in particular the nuclear industry.

If it is true that it has a quite particular advantage for factories reprocessing used nuclear fuels, it may however be exploited for regenerating iodine filters which are used in other types of nuclear installations which, because of their activity, are led to produce iodine-contaminated gas effluents, which is for example the case of units for producing radioactive isotopes, or else which are equipped with so-called <<safety>> iodine traps, provided so as to only operate in the case of an accidental discharge of iodine, which is for example the case of nuclear power stations.

Other features and advantages of the invention will become better apparent upon reading the following examples and which relate to experimental tests having allowed validation of the method according to the invention.

Of course, these examples are only given as illustrations of the object of the invention and by no means form a limitation of this object.

Example 1

Extraction of the Iodine from a Used Iodine Filter

Tests having allowed validation of step a) of the method according to the invention were conducted on samples of an iodine filter having been in operation for 6 years in a factory for reprocessing irradiated nuclear fuels.

This filter initially consisted of porous beads of alumina (diameter: 1 to 2 mm; specific surface area: $\approx 100$ m$^2$/g; a total porous volume: $\approx 0.25$ mL/g) impregnated with silver nitrate with 12% by mass of silver.

After 6 years of use in a factory, its average iodine load was about 60 mg of iodine/g of alumina beads.

Observations with a scanning electron microscope as well as measurements of the specific surface area and of the total pore volume of the filter did not allow notable differences to be shown between the structural and physical characteristics exhibited by this filter before and after its use.

The extraction of the iodine present in the beads was achieved by placing each of the samples inside a tube, between two filters with a diameter of less than that of the beads, and by circulating in the tube an aqueous solution containing 1 mol/L of soda and 2 mol/L of sodium ascorbate, at a temperature equal to room temperature, at a rate of 10 mm/second, so that this solution crosses the bed formed by the beads. The circulation of the basic aqueous solution was maintained for 3 hours.

After this, the samples were taken out of the tube, washed with water, always at room temperature and dried for 12 hours at 100° C., this drying being essentially intended for allowing their analyses.

The results of these analyses have shown that regardless of the processed sample:
- the residual iodine content of the beads is less than 3 mg of iodine/of beads, which corresponds to a decontamination factor at least equal to 30;
- the residual silver content of the beads is close to their initial silver content (i.e. 12% by mass); and that
- the beads retained their initial characteristics, notably in terms of diameter and hardness, and that the basic aqueous solution used for decontaminating them from iodine contains very few elements likely to express possible corrosion of the beads (dissolved alumina, suspended materials, . . . ).

Example 2

Extraction of the Silver from the Filter

Tests having allowed validation of step b) of the method according to the invention were conducted by using laboratory samples, consisting of porous alumina beads manufactured in a way identical with that of the beads forming the solid support of the iodine filter used in Example 1, which was loaded with iodine beforehand and with silver nitrate (in an amount of 12% by mass) and then decontaminated from iodine.

The extraction of the silver present in the beads was achieved by placing the samples inside a tube, between two filters with a diameter of less than that of the beads, and by circulating in this tube a nitric solution of 3N acidity and with a temperature equal to 20° C., for 6 hours.

After removing the samples from the tube, their residual silver content was measured.

The results of these measurements have shown that silver decontamination of the beads is quantitative.

Example 3

Impregnation of the Filter with Silver

Tests having allowed validation of step c) of the method according to the invention were conducted by using laboratory samples, consisting of porous alumina beads manufactured in an identical way with that of the beads forming the solid support of the iodine filter used in Example 1, virgin beads (i.e. having never been impregnated with silver) or having been decontaminated from silver beforehand.

Impregnation of the beads with silver was achieved by soaking the samples, after having placed them in a basket, in an impregnation solution containing 1 mol/L of silver and with a temperature equal to room temperature, for 1 hour.

After removing the samples from the impregnation solution and drying, their silver content was measured.

The results of these measurements have shown that this content is of the order of 12% by mass.

What is claimed is:

1. A method for regenerating a solid filter containing iodine in the form of silver iodide and/or iodate and possibly molecular iodine physisorbed, in a solid filter containing silver in the form of nitrate, which comprises the following steps:
   a) extracting the iodine contained in the filter by putting the filter into contact with a basic aqueous solution containing a reducing agent, at room temperature, and then separating the filter from the basic aqueous solution;
   b) extracting the silver contained in the filter obtained in step a) by putting the filter into contact with an acid aqueous solution, and then separating the filter from the acid aqueous solution; and
   c) impregnating the filter obtained in step b) with silver by putting the filter into contact with a silver nitrate solution, and then drying the filter.

2. The method according to claim 1, wherein the reducing agent used in step a) is ascorbic acid or a salt thereof.

3. The method according to claim 1, wherein the basis aqueous solution used in step a) comprises from 0.5 to 2 mol/L of ascorbic acid or of a salt thereof and has a pH from 10 to 14.

4. The method according to claim 1, wherein the acid aqueous solution used in step b) is a nitric acid solution having a nitric acid concentration from 0.2 to 6 mol/L.

5. The method according to claim 1, wherein step b) further comprises, after separating the filter from the acid aqueous solution, drying the filter for 5 to 24 hours, in air in an oven or under a partial vacuum at a temperature below 120° C., and then optionally under an inert gas at a temperature from 120 to 500° C.

6. The method according to claim 1, wherein the silver nitrate solution used in step c) is the acid aqueous solution obtained at the end of step b), after adjusting, if necessary, the silver content and/or the acidity of said acid aqueous solution.

7. The method according to claim 1, wherein the silver nitrate solution used in step c) has a silver concentration from 20 to 200 g/L.

8. The method according to claim 1, wherein the drying of the filter provided in step c) is carried out at a temperature below 120° C., at atmospheric pressure or under a partial vacuum.

9. The method according to claim 1, wherein the filter contains 12% by mass of elementary silver in the form of nitrate at the end of step c).

10. The method according to claim 1, wherein the filter comprises a porous mineral solid support selected from the group consisting of porous silica or alumina beads.

* * * * *